(12) United States Patent
Levingston

(10) Patent No.: US 7,641,381 B2
(45) Date of Patent: Jan. 5, 2010

(54) MECHANICAL OSCILLATOR SYSTEM

(76) Inventor: Gideon Levingston, 50, avenue Francis de Croisset, F-06130 Grasse (FR)

( * ) Notice: Subject to any disclaimer, the term of this patent is extended or adjusted under 35 U.S.C. 154(b) by 240 days.

(21) Appl. No.: 10/520,926

(22) PCT Filed: Jul. 10, 2003

(86) PCT No.: PCT/GB03/03000

§ 371 (c)(1),
(2), (4) Date: Feb. 6, 2006

(87) PCT Pub. No.: WO2004/008259

PCT Pub. Date: Jan. 22, 2004

(65) Prior Publication Data

US 2006/0225526 A1   Oct. 12, 2006

(30) Foreign Application Priority Data

Jul. 12, 2002 (FR) .................................. 02/08802

(51) Int. Cl.
*G04B 17/00* (2006.01)
*G04B 17/04* (2006.01)

(52) U.S. Cl. .................. 368/127; 368/169; 368/175

(58) Field of Classification Search ................ 368/124, 368/127, 140, 158, 161, 168, 175
See application file for complete search history.

(56) References Cited

U.S. PATENT DOCUMENTS

| | | | |
|---|---|---|---|
| 209,642 A | 11/1878 | Berlitz | |
| 1,974,695 A * | 9/1934 | Straumann | 420/94 |
| 2,568,326 A | 9/1951 | Dubois | |
| 3,187,416 A | 6/1965 | Tuetey et al. | |
| 3,547,713 A * | 12/1970 | Steinemann et al. | 148/501 |
| 3,624,883 A | 12/1971 | Baehni | |
| 3,683,616 A | 8/1972 | Steinemann et al. | |
| 3,735,971 A * | 5/1973 | Steinemann | 267/182 |
| 3,773,570 A * | 11/1973 | Steinemann et al. | 148/400 |
| 3,813,872 A | 6/1974 | Nakagawa et al. | |
| 4,260,143 A | 4/1981 | Kliger | |
| 4,765,602 A | 8/1988 | Roeseler | |
| 5,043,117 A | 8/1991 | Adachi et al. | |
| 5,678,809 A | 10/1997 | Nakagawa et al. | |
| 5,881,026 A | 3/1999 | Baur et al. | |
| 5,907,524 A | 5/1999 | Marmy et al. | |
| 6,329,066 B1 * | 12/2001 | Baur et al. | 428/472.1 |
| 6,357,733 B1 | 3/2002 | Wulz et al. | |
| 6,705,601 B2 * | 3/2004 | Baur et al. | 267/157 |
| 2002/0070203 A1 | 6/2002 | Serex | |
| 2002/0167865 A1 * | 11/2002 | Tokoro et al. | 368/175 |

FOREIGN PATENT DOCUMENTS

| | | |
|---|---|---|
| DE | 19651320 | 6/1998 |
| DE | 19651321 | 6/1998 |
| DE | 19651322 | 6/1998 |
| EP | 0 393 226 | 10/1990 |
| EP | 0 732 635 | 9/1996 |
| EP | 1 039 352 | 9/2000 |
| EP | 1 256 854 | 11/2002 |
| EP | 1 302 821 | 4/2003 |
| EP | 1 351 103 | 10/2003 |
| EP | 1 422 436 | 5/2004 |
| EP | 1 445 670 | 8/2004 |
| GB | 2 041 152 | 9/1980 |
| JP | 1006537 | 1/1989 |
| JP | 1110906 | 4/1989 |
| JP | 1110907 | 4/1989 |
| JP | 1110908 | 4/1989 |
| JP | 1110909 | 4/1989 |
| JP | 07138067 | 5/1995 |
| JP | 09257069 | 9/1997 |
| JP | 11147769 | 6/1999 |
| WO | WO 96/14519 | 5/1996 |
| WO | WO 01/01204 | 1/2001 |
| WO | WO 2004/008259 | 1/2004 |
| WO | WO 2005/017631 | 2/2005 |

OTHER PUBLICATIONS

Levingston, G., "A New Material for Balance Springs," Horological Journal, Jul. 2004, pp. 243-245.
Randall, Anthony, Glass Balance Springs—Part 1, 1951, pp. 135-137, vol. III, Bulletin de la Societe Suisse de Chronometrie.
Stephen, Richard, Carbon Fibre Pendulum Rods, Feb. 2000, Horological Journal.
Edwards, Evan, Carbon Fibre Rods for Pendulums, Jun. 2000, Horological Journal.
Glass Balance Springs—Part 2, 1952, pp. 246-249, vol. III, Ibid.
XP-002313758, Spiral (multi-language encyclopedic? article on spiral spring).

* cited by examiner

*Primary Examiner*—Vit W Miska
(74) *Attorney, Agent, or Firm*—Stites & Harbison PLLC; Douglas E. Jackson

(57) ABSTRACT

A mechanical oscillator system comprising a balance wheel and a spiral or helicoidal balance spring for use in horological mechanisms or other precision instruments. The balance spring is made of a non-magnetic composite, polymer, carbon or ceramic material, preferably a composite material of carbon fibres in a polymer, carbon or ceramic matrix, and the balance wheel is made from a non-magnetic ceramic. The values of the thermal expansion coefficients for the balance spring and balance wheel are similar, very small and stable over a wide temperature range. The expansion coefficients in the axial sense of the spring and of the balance wheel are of opposite sign and they compensate one another. The density of these materials is smaller than that of the currently used metals. Through this combination of materials it is possible to obtain significant advantages and a higher level of accuracy and stability compared with metal oscillator systems.

20 Claims, 1 Drawing Sheet

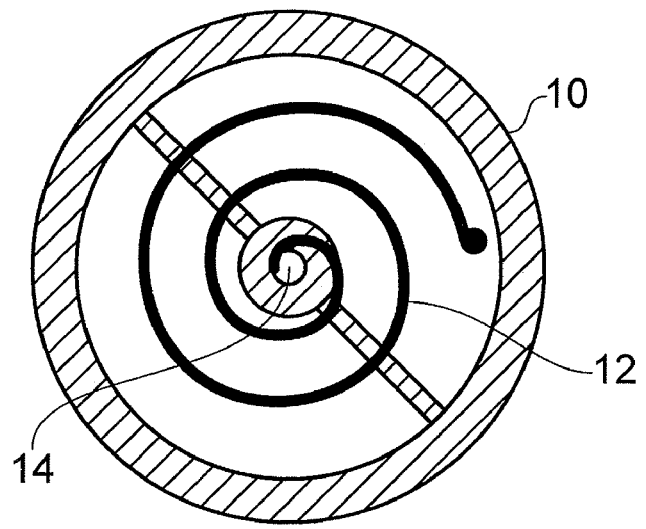
FIG. 1
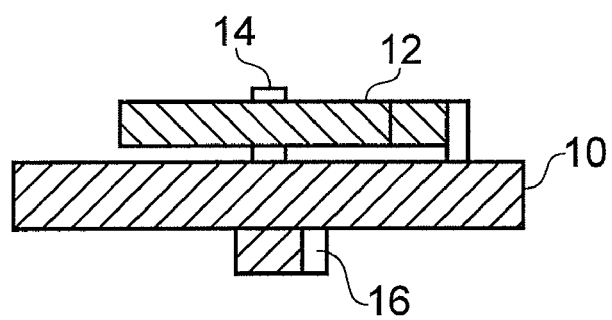
FIG. 2
FIG. 3A
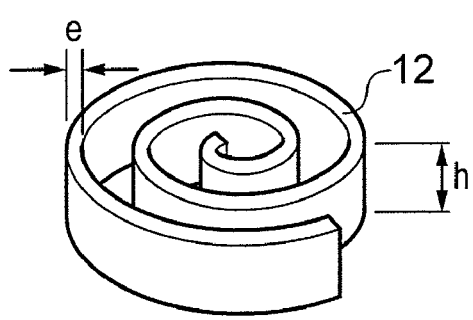
FIG. 3B
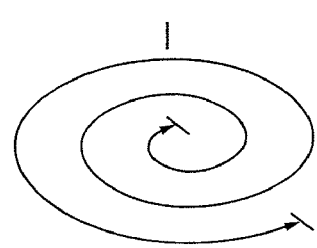

MECHANICAL OSCILLATOR SYSTEM

The present invention relates to a mechanical oscillator system comprising a balance and balance spring for use in horological mechanisms (e.g. timekeeping devices) or other precision instruments. It is thought that it will be particularly applicable to the oscillator system in a mechanical watch, although the present invention is not limited to this.

Previous mechanisms use metal alloys, in particular Fe—Ni or Ni, Cu—Be, Au—Cu alloys, for the balance spring and balance. At its most general, in one of its aspects, the present invention proposes that the balance is made of a non-magnetic ceramic material and the balance spring is non-magnetic and is made of a composite material, or a polymer (including thermoset and thermoplastic polymers, esters and phenolic based resins), carbon or (non-magnetic) ceramic material.

In contrast to metals, the above materials are non-susceptible to the effects of magnetism—including electromagnetic damping and magnetically induced change of the Young's modulus. These materials have some intrinsic thermal characteristics which are better than metals and so a mechanical oscillator system having reduced variation of oscillator frequency with temperature can be made. Variation with temperature is discussed below in more detail. A balance spring of the above materials may be less susceptible to internal mechanical (e.g. friction) damping of the Young's Modulus, allowing amplitude to be maintained by the balance and a higher frequency of oscillation and therefore a more accurate horological mechanism or precision instrument than a metal spring.

The balance spring is arranged to oscillate the balance.

Preferably the balance is a balance wheel; the balance spring may be arranged inside the circumference of the balance wheel so as to oscillate the balance wheel back and forth about its axis of rotation as is conventional.

The balance may be coupled to an escapement mechanism for regulating rotation of an escape wheel (which is e.g. coupled to the hands of a watch), as is also conventionally known.

Preferably the balance spring works in flexion to oscillate the balance, most preferably exclusively in flexion. That is the balance spring is preferably not relying on strain or shear properties for the repeated store and release of energy during its (relatively rapid) oscillations. Preferably the balance spring coils are not in contact with each other, i.e. there is a gap between adjacent coils. This eliminates or reduces friction and allows the successive coils to act unhindered by one another.

While the main body of the balance is made of a ceramic material, it may have small appendages of other materials.

Considerations relating to the oscillator frequency and in particular its variation with temperature will now be discussed.

The accuracy of a mechanical watch is dependent upon the specific frequency of the oscillator composed of the balance wheel and balance spring. When the temperature varies, the thermal expansion of the balance wheel and balance spring, as well as the variation of the Young's Modulus of the balance spring, change the specific frequency of the oscillating system, disturbing the accuracy of the watch. The inventor has noticed that in known systems approximately three quarters of the variation is due to thermal or magnetically induced changes in the balance spring. Methods for compensating these variations are based on the consideration that the specific frequency depends exclusively upon the relationship between the torque of the balance spring acting upon the balance and the moment of inertia of the latter as is indicated in the following relationship $$T = 2\pi \sqrt{I/G} \quad [1]$$

T: the period of oscillation, I: the moment of inertia of the balance wheel, G: the torque of the balance spring.

The moment of inertia of the balance wheel is a function of its masse M and its radius of gyration r.

The torque of the balance spring is a function of its dimensions: length l, height h, thickness e, and of its Young's Modulus E. The length l of the balance spring (which may be helical or spiral form) is the whole length of the spring, end to end, as distinct from e.g. a top to bottom measurement that varies according to the spacing of the coils.

The relationship [1] is therefore written:

$$T = 2\pi \sqrt{12.M.r^2 . l/E.h.e^3} \quad [2]$$

Temperature variations influence T (the period of oscillation) resulting from the effects of expansion and contraction of the system (balance spring and balance wheel) l, h and e for the balance spring, and r for the balance wheel whose mass m remains constant.

It is known how to compensate for the effects of expansion on l, h and e. However the period of oscillation is still subject to variations of r and E in keeping with the relationship expressed by:

$$r/\sqrt{E} \quad [3]$$

These two terms are not in a linear relationship.

It is necessary that this relationship should remain as constant as possible (so as to keep the period T of oscillations constant).

Fe—Ni metal spring alloys render an approximate solution when the alloy is perfectly de-magnetised. However, when the alloy is not perfectly demagnetised, the relationship is no longer constant: $\sqrt{E}$ changes.

The currently employed metal alloys for balance springs show an increase in E (which is considered abnormal) and also in l, for an increase in temperature, over the ambient temperature range up to 40° C. The balance wheels currently employed in precision watches are of an Au—Cu alloy with a coefficient of thermal expansion $\alpha$ between +14 and +17× $10^{-6}/K^{-1}$ compensate for changes in the Young's modulus of the balance spring.

In summary, the currently used metal alloys despite compensation, only allow for the stability of T (period of oscillation) over a narrow temperature range and only when the balance spring alloy remains un-magnetised. (Any watch currently employing a Fe—Ni balance spring may be stopped by a sufficient magnet).

Preferably the balance spring material comprises continuous fibres extending along the length of the balance spring from one end of said spring to the other end of said spring.

As the fibres are continuous extending along the length of the balance spring from one end to the other, the degree to which the spring expands (or contracts) with an increase in temperature can be controlled fairly accurately by appropriate choice of the fibre material.

Preferably the continuous fibres are part of a composite material, although it is possible to have a balance spring of continuous fibres in a non-composite material (i.e. without a matrix, e.g. long ceramic fibres).

Where the material is a composite material, preferably the matrix phase comprises a polymer (of any of the types discussed above), carbon or a ceramic. In the case of a composite material with ceramic fibres, the fibres may be continuous fibres extending along the length of the spring from one end of the spring to the other as discussed above, or smaller fibres that do not extend all the way along the spring.

Where ceramic fibres are used (with or without a matrix), it is important that the ceramic is a non-magnetic ceramic. Preferably, but not necessarily, the balance spring ceramic is Alumina-Silica-Boria. Fused quartz or silica may also be used for the balance.

Preferably the thermal coefficient of expansion of the balance and the thermal coefficient of expansion of material of the balance spring, in the direction along the length of the balance spring, are of opposite signs and of similar orders of magnitude (i.e. the difference in magnitude between the two is not more than a factor of 6 and one of the α coefficients should not be greater than $1\times10^{-6}$ $K^{-1}$). In this way expansion of one can be compensated for by contraction of the other. For example, if said thermal coefficient of expansion of the balance spring is negative and said thermal coefficient of expansion of the balance is positive then with an increase of temperature r increases, but l decreases and in accordance with equation [2] these effects combine to assist in compensating for thermal variation in said period of oscillation T.

Preferably said coefficient of expansion are both very small. For example preferably the coefficient of thermal expansion of the balance is positive and less then $1\times10^{-6}$ $K^{-1}$ and the coefficient of thermal expansion of the material of the balance spring in the direction along the length of the balance spring is negative, but greater than $-1\times10^{-6}/K^{-1}$.

The variation of E (Youngs Modulus) with temperature is also important and is determined by the thermoelastic coefficient which is a measure of the unit change in Young's Modulus per unit increase in temperature.

Preferably the thermoelastic coefficient of the material of the balance spring is negative; most preferably 1% in the temperature range 0 to 60 degrees Celsius.

In general, the formula for timekeeping changes (U) consequent upon a rise in temperature of 1° C. is $U=\alpha_1-3\alpha_2/2-\delta E/2E$ Thus U can be made to tend to zero when suitable values of $\alpha_1$ (balance coefficient of thermal expansion), $\alpha_2$ (balance spring coefficient of thermal expansion) and the thermo-elastic coefficient $\delta E/E$ are selected by selection of appropriate materials.

The tolerances represented by small $\alpha_1$, $\alpha_2$ (e.g. less than $6\times10^{-6}$ $K^{-1}$) and a small thermo-elastic value $\delta E/E$ allow much more readily for U to be kept low.

Preferably the continuous fibres are ceramic fibres or carbon fibres, most preferably carbon fibres having a graphitic carbon structure. Graphitic carbon structure has a negative longitudinal coefficient of thermal expansion. The fibres may for example be produced from a "PITCH" precursor or a polyacrilonitrile "PAN" precursor.

The fibres may be laid parallel to each other along their lengths, or may be twisted together. Twisting the fibres together modulates the coefficient of thermal expansion and Young's Modulus of the balance spring material and may be useful where the fibres have a high and the matrix a low Young's Modulus or coefficient of thermal expansion.

Preferably the coefficient of thermal expansion of the balance spring material in the direction along the length of the balance spring is linear up to 700° Kelvin. This allows the system to be very stable in the ambient range (0-40° C.) and also to compensate for thermal variations over a large range. Preferably said coefficient of thermal expansion is negative.

Preferably the damping of the modulus of elasticity of the balance spring is of the order of 0.001 pa.

Preferably the density of the composite material of the balance spring is less than $3g/cm^3$.

Preferably the balance is formed by high precision injection moulding.

Further aspects of the present invention also provide a horological mechanism or other precision instrument comprising the above described mechanical oscillator system.

An embodiment of the invention will now be described with reference to the accompanying drawings, in which:

FIG. 1 is a plan view in partial cross section of a mechanical oscillator system for use in horological mechanisms;

FIG. 2 is a cross-sectional side view of the mechanical oscillator system shown in FIG. 1; and FIG. 3A is a perspective view of the balance spring shown in the mechanical oscillator system of FIG. 1, while FIG. 3B is a schematic view of the balance spring.

A mechanical oscillating system for use in a horological mechanism or other precision instrument comprises a balance, in the form of a balance wheel, and a balance spring arranged to oscillate said balance around an axis of rotation.

An example of a mechanical oscillator of this general type is shown in FIGS. 1 and 2. Attached to the spindle 14 of the balance 10 is a spiral spring 12, which controls the oscillations of the balance 10. Attached to the balance 10 is a pin 16 which engages with a lever (not shown) arranged to transfer motion of the balance to an escapement mechanism (not shown).

FIG. 3A shows a perspective view of the balance spring 12 in which the dimensions of height h and thickness e are labeled. FIG. 3B shows a schematic view in which the dimension of length l is labeled; where the length l of the balance spring (shown as a spiral in this example) is the whole length of the spring, end to end.

The balance wheel is made of a non-magnetic ceramic for which the coefficient of thermal expansion is, positive and less than $+6\times10^{-6}$ $K^{-1}$, most preferably less than $1\times10^{-6}$ $K^{-1}$. Quartz is one example of a suitable material.

Preferably high purity fused quartz is used, fused quartz has a coefficient of thermal expansion of $\leq+0.54\times10^{-6}$ $K^{-1}$. Other alternative ceramic materials include Aluminium Nitride (+5.2), Alumino-Silicate-Glass (+5), Boron Carbide (+5.6), Boron Nitride (+1.6), Silica (+0.75), Silicon hot-pressed or reaction bonded (+3.5) and Zirconia (stabilised) (+5); the numbers is brackets indicate the order of magnitude of the coefficient of thermal expansion of these materials in units $\times10^{-6}$ $K^{-1}$ The method of fabrication of the balance wheel may preferably be by high precision injection moulding.

The balance spring is shaped into an Archimedes flat spiral or helicoid form. It is made from a composite material comprising continuous carbon fibres which are either twisted or laid parallel to each other, the fibres being continuous lengths of fibres which extend from one end of the spring to the other along the length l of the spring. The fibres are derived according to the stiffness required from the precursor pitch (a mixture of thousands of different species of hydrocarbon and heterocyclic molecules) or polyacrilonitrile 'PAN' (derived from a carbon graphitic structure). The fibres are coated and set in a matrix phase of polymer (thermosetting polymer, thermoplastic polymer, ester or phenolic base resin etc), ceramic or carbon. The composite material acts in a flexural manner. The axial modulus of elasticity of the fibres is between 230 and 1000 Gpa. The composite has both a lower density less than 3 $g/cm^3$ and coefficient of damping of its Young's modulus of the order of (0.001 pa), both less than the currently employed metal alloys. Its thermal expansion coefficient (α) in the direction along the length of the spring remains both negative and stable to 700° Kelvin, and is greater than $-1 \times 10^{-6}$ K$^{-1}$.

This composite material is non-magnetic and obviates the negative effects of magnetism. The coefficient of thermal expansion α of the spring is negative and acts in parallel with the spring's Young's modulus which decreases linearly with a rise in temperature and is therefore negative (normal).

The values of the coefficients of thermal expansion (the α coefficients) for the spring and the balance are similar, very small and of opposite sign which further assist in the compensation for temperature variation.

The α coefficient of the spring remains the same over a wide temperature range, and the range of its use between 5° and 40° C. represents only 5% at the centre of the total stable temperature range.

Thus, following the relationship:

$$T=2\pi\sqrt{12.M.r^2.l/E.h.e^3} \quad [2]$$

the numerator does not increase in value as is the case with the metal alloys when the temperature increases because the α coefficient of the fibre composite in the axial sense l is negative, and therefore it diminishes. The denominator also diminishes when the temperature rises because the thermoelastic coefficient is negative (normal). Furthermore the height (h) and thickness (e) of the carbon fibre-matrix composite balance spring also increase with temperature which also counteracts the decrease in Young's Modulus E with rising temperature.

By this combination of materials and their mechanical properties it is possible to obtain both greater accuracy and stability. The damping effect of the modulus of elasticity is one tenth of the value of the currently employed metal alloy and the reduced energy losses due to the decreased damping and density of the material allow to envisage maintaining stable amplitude and a significant increase in frequency and significantly reduced total energy losses in the oscillator system.

As has been explained above the present invention can be applied to a conventional mechanical oscillator system in a time keeping device such as a watch. An example of a conventional mechanical oscillator system in a time keeping device is illustrated and described on pages 194 to 195 of "How Things Work", volume 1 published 1972 by Paladin, UK, which is incorporated herein by reference.

The invention claimed is:

1. A mechanical oscillator system for a horological mechanism or other precision instrument, the system comprising
   a non-magnetic ceramic balance and
   a non-magnetic balance spring formed of a composite material or a polymer, carbon or ceramic material,
   wherein the balance and balance spring are adapted such that the coefficient of thermal expansion of the balance ($\alpha_1$), the coefficient of thermal expansion of the balance spring ($\alpha_2$) and the thermoelastic coefficient of the balance spring ($\partial E/E$) cooperate to compensate for thermal variation in the system.

2. A system according to claim 1, wherein the material of the balance spring is a composite material having a matrix phase comprising polymer, carbon or ceramic.

3. A system according to claim 1, wherein the balance spring material comprises continuous fibres extending along the length of the balance spring from one end of said spring to the other end of said spring.

4. A system according to claim 3, wherein said continuous fibres are carbon fibres.

5. A system according to claim 3, wherein the fibres are produced from one of the precursors 'PITCH' or polyacrilonitrile 'PAN'.

6. A system according to claim 1, wherein the material of the balance spring is a composite material having a coefficient of thermal expansion in the direction along the length of the balance spring which is negative and exhibits linear thermal variation up to 7000° Kelvin.

7. A system according to claim 1, wherein the damping of the modulus of elasticity of the balance spring is of the order of 0.001 Pa.

8. A system according to claim 1, wherein the balance spring material comprises ceramic fibres.

9. A system according to claim 8, wherein said ceramic fibres have a coefficient of thermal expansion whose magnitude is less than $6 \times 10^{-6}$ K$^{-1}$.

10. A system according to claim 3, wherein said fibres are substantially parallel to each other.

11. A system according to claim 3, wherein said fibres are twisted together.

12. A system according to claim 1, wherein the balance spring is a flexion spring configured to work in flexion to oscillate the balance.

13. A system according to claim 1, wherein the density of the balance spring material is less then 3 g/cm$^3$.

14. A system according to claim 1, wherein the balance is formed by high precision injection moulding.

15. A system according to claim 1, wherein the material of the balance spring has a negative thermoelastic coefficient.

16. A system according to claim 1, wherein the balance spring is of flat spiral or helicoidal form, and the coefficient of thermal expansion of the balance spring in a direction along its length and the coefficient of thermal expansion of the balance are of opposite signs and of similar orders of magnitude.

17. A system according to claim 16, wherein the coefficient of thermal expansion of the balance is positive and the coefficient of thermal expansion of the material of the balance spring in the direction along the length of the balance spring is negative.

18. A system according to claim 17, wherein the thermal coefficient of expansion of the balance is less than $1 \times 10^{-6}$ K$^{-1}$ and the coefficient of thermal expansion of the material of the balance spring in the direction along the length of the balance spring is greater than $-1 \times 10^{-6}$ K$^{-1}$.

19. A system according to claim 1, wherein the respective magnitudes and thermal variations of the coefficient of thermal expansion of the material of the balance ($\alpha_1$), the coefficient of thermal expansion of the material of the balance spring ($\alpha_2$) and the thermoelastic coefficient of the material of the balance spring ($\partial E/E$) are selected such that, for thermal variation within a predetermined temperature range, the variation (U) in timekeeping changes for the system is minimized, where $$U=\alpha_1-3/2\alpha_2-1/2\partial E/E.$$

20. A non-magnetic balance spring for oscillating a balance in an oscillator mechanism for a horological instrument, the balance spring formed from a composite material or a polymer, carbon or ceramic material,
   wherein the balance spring material has a coefficient of thermal expansion ($\alpha_2$) and a thermoelastic coefficient ($\partial E/E$) arranged to cooperate with a coefficient of thermal expansion of the balance ($\alpha_1$), by decreasing in length and increasing in thickness with increase in temperature to compensate for thermal variation in the system.

* * * * *

UNITED STATES PATENT AND TRADEMARK OFFICE
CERTIFICATE OF CORRECTION

PATENT NO. : 7,641,381 B2  Page 1 of 1
APPLICATION NO. : 10/520926
DATED : January 5, 2010
INVENTOR(S) : Gideon Levingston It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this

Sixteenth Day of November, 2010

David J. Kappos
*Director of the United States Patent and Trademark Office*